Nov. 4, 1969   J. V. MILEWSKI   3,476,641
HIGH-STRENGTH SINGLE CRYSTAL WHISKER PAPER
COMPOSITES AND LAMINATES
Filed June 1, 1965
FIG. 2
FIG. 1
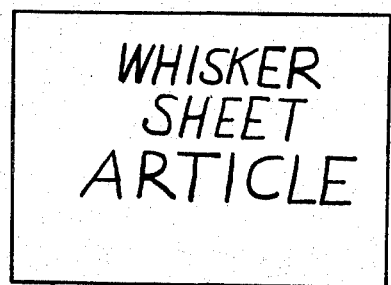
(a) →
← (a)
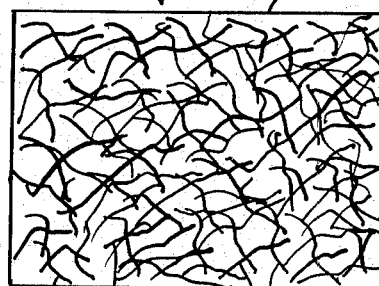
mix with binder
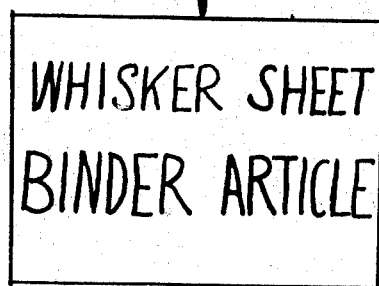
(b) →
← (b)
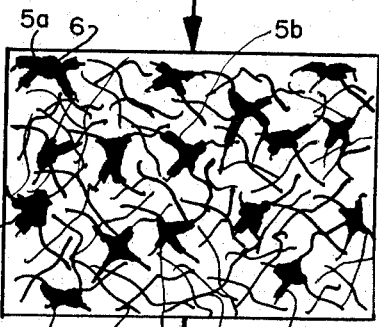
mix with matrix
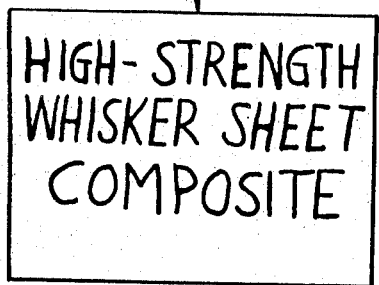
(c) →
← (c)
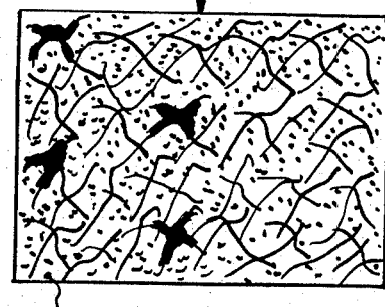
INVENTOR
JOHN V. MILEWSKI

United States Patent Office 3,476,641
Patented Nov. 4, 1969

3,476,641
HIGH-STRENGTH SINGLE CRYSTAL WHISKER PAPER COMPOSITES AND LAMINATES
John V. Milewski, Saddle Brook, N.J., assignor to General Technologies Corporation, Reston, Va., a corporation of Delaware
Filed June 1, 1965, Ser. No. 460,419
Int. Cl. D21h 1/10; B32b 5/16
U.S. Cl. 161—170                    2 Claims

ABSTRACT OF THE DISCLOSURE

A high-strength whisker paper composite article and laminate is described. The article includes a plurality of discontinuous and interconnected single crystal whisker of defined dimension in the form of a firm, compact, porous paper, a binder and a matrix material. Several papers are laminated together to form the laminate shaped article.

---

This invention relates to single crystal whiskers, and more particularly, to whisker sheet composites having advantageous properties.

Single crystal fibers, or "whiskers," are known to possess strengths much higher than the same material in bulk form. The term "whiskers," as used herein, is intended to be commensurate with its meaning in the art, namely, that of single crystal inorganic materials in a fibrous form. Such materials include elemental metals, and metallic oxides, carbides and nitrides. The existence of such materials has prompted the use of whiskers in structures which require high tensile strengths. For example, a mixture of discontinuous sapphire whiskers (single crystal fibers of alpha-alumina) in a plastic matrix exhibits exceedingly high tensile strength, a high modulus of elasticity and good retention of strength. Furthermore, unlike glass filaments previously used for reinforcement application, whisker surfaces are not sensitive to abrasion or hydrolytic attack.

The full potential of whisker-containing composites can be realized, however, only upon the attainment of the ultimate tensile strength of the whisker in the composite. Generally whisker composites are made by chopping up a bath of individual short-length whiskers, and mixing the loose whiskers with a matrix material, such as a plastic, or powdered metal, and molding to a desired size and shape. This technique, however, does not provide complete intimate contact at the interface between the whiskers and the matrix. Structural failure then can be initiated at a whisker-matrix interface where there is poor material contact. When such interfacial bonding is poor, the ineffective whisker length becomes substantially an unsupporting volume fraction of the composite.

Accordingly, in order to maximize the bonding strength between whisker and matrix, it is necessary for the matrix material to wet the whiskers. The manner of achieving improved wetted whisker-matrix structures in a sheet article form is the subject of the present invention.

Other desirable properties of a commercial whisker-reinforcement structure include predetermined whisker orientation, and distribution or concentration of whiskers in the composite. The articles also should be durable, of a selected size and shape, and be capable of being manufactured and handled easily.

Therefore, it is an object of the present invention to provide a whisker-sheet article having advantageous properties when compared to previous whisker structures.

Another object is to provide a whisker-sheet reinforcement article in which the whiskers are prewetted with a binder material.

A further object herein is to provide a whisker-sheet article in which the whiskers have a predetermined orientation and distribution.

Still another object is to provide a method of making such structures.

Among the other objects of the present invention is to provide a method of making a springy whisker-sheet article having a predetermined distribution or concentration of whiskers.

These and other objects of the invention will be made apparent from the following more detailed description of the invention in which reference will be made to the accompanying drawings, in which:

FIGURES 1a through c show the whisker article at various stages in the process.

FIGURES 2a through c is a flow diagram to illustrate the process steps utilized in the present invention.

In accordance with the foregoing objects, there is provided herein a whisker composite article including a whisker sheet having a plurality of whiskers oriented substantially parallel to the surfaces of the sheet. Whisker sheets per se are the subject of a copending patent application by John V. Milewski and Reuben A. Keppel, Ser. No. 425,820, filed Jan. 15, 1965, now abandoned. The article of the present invention includes a binder material which wets the whiskers and fills the joints of the whiskers of the sheet thereby to strengthen the whisker-sheet. The article is placed in a matrix which is wetted to the whiskers through the binder material.

Accordingly, in the present invention, actual wetting of discontinuous whisker surfaces in the sheet is achieved through the presence therein of a binder material which forms an intermediate bond with the whiskers. Preferably the binder and composite matrix materials are of similar composition. However, dissimilar materials also may be used as long as they wet the whiskers and they are compatible therewith.

Plastics and metals are particularly useful as binder materials herein. Epoxy resins are particularly good plastics for this purpose because of superior wetting ability with whiskers within the sheet article. In addition, they possess toughness, good adhesive properties, and chemical inertness. Suitable epoxy resins include those derived from diglycidyl ethers of disphenol-A, using conventional anhydride, amine and catalytic curing agents. Mechanical properties can be modified by using co-reactants, such as polyesters, polyether, and polyamides. Other types of epoxy resins, such as those based on resorcinol diglycidyl ether, epoxylated novolaks, dicyclopentadienes dioxide. limonene dioxide, and other peroxy formed materials can be used too.

Phenolic resins also are desirable as binder materials because of their low heat distortion at elevated temperatures. Conventional phenol, alkyl-phenol-formaldehydes, and unsaturated polyester resins are also useful as binder materials for whisker-sheets. Triazine-containing modifiers are particularly desirable because of their crosslinking ability and thermal stability. Triallyl isocyanurate polyester resins are satisfactory. Other resins which may be used include polyurethanes, alkyds, polybenzimidazole, polyimide, and the like. Selection of a particular resin is determined by a combination of properties, including wettability, strength, modulus, toughness and ease of handling.

While many different metallic binder materials are considered suitable for use herein, satisfactory results have been obtained with such metallic binders as nickel, copper, aluminum, Nichromes and Monel metals.

The binder should be selected to be compatible with the matrix in which it is to be used. For example, a solvent phenolic is a good binder for a thermo-setting plastic matrix. Phosphate and silica solutions are suitable binders for ceramic slip-casting applications; and an electroplated, vapor-plated or vacuum-metalized coating is preferred as a binder for a metal matrix.

Preferably the whiskers used herein are selected from among metallic oxides, carbides and nitrides, although others may be used as well. Within these classes suitable whisker materials include aluminum oxide, magnesium oxide, beryllium oxide, silicon carbide, boron carbide, aluminum nitride, and silicon nitride.

Referring now to FIGURE 1a, there is shown a top view of a single crystal whisker sheet. Included in the term "sheet" are papers, mats, felts, and the like. The sheet is made up of a plurality of substantially discontinuous individual whiskers, 2a, 2b, 2c, 2d, etc., which are interconnected to form a continuous whisker network. Substantially all the whiskers exhibit biaxial orientation, i.e. they are oriented substantially parallel to the major surfaces 3 and 4 of the sheet. The whiskers in the sheet shown in FIGURE 1a exhibit random orientation within the plane of the sheet. However, the whiskers in the sheet also may be oriented preferably in one direction in the plane of the sheet.

The individual whiskers which constitute the sheet are short, essentially flat and straight fibers whose dimensions can be described in approximate form in terms of a rod with a length, L, characteristic of its fibrous nature, and an equivalent diameter, D, which is related to its flake-like form. A typical whisker of alpha-alumina, for example, used for illustrative purposes only hereinafter, is a flat, elongated fiber or parallelogram in cross-section.

The whisker materials themselves, used in making the whisker sheet of the invention may be prepared in any manner known in the art. Preferably, however, alpha-alumina is made according to the manner described in the copending patent application by J. J. Shyne and J. V. Milewski, S.N. 373,982, filed June 10, 1964 now abandoned.

In order to impart high strength to the sheet, it is desirable that the whiskers be made within predetermined dimensions. Generally if the whiskers are too short the paper is very weak. However if they are too long, there is a tendency for the fibers to tangle appreciably. Excessive tangling prevents formation of any sheet as such. Preferably the whisker length, L, is between about 200 to 2500 microns. The whiskers usually have a diameter of about 0.5 to 50 microns.

Another dimensional characteristic which influences sheet strength is the length to diameter ratio, or $L/D$ ratio. A suitable $L/D$ ratio for manufacture of a high strength whisker sheet is between about 50–5,000. The preferred range is about 250–2,500.

The whisker sheet is usually of high porosity. The porosity of the sheet may be defined as the percentage of empty space therein, that is, the volume of the sheet less the volume of the whiskers, divided by the volume of the sheet. Generally the porosity is over 90%. High porosity is a desirable property of the sheet because it enables the binder and matrix materials to be incorporated therein.

In general, the method of preparing the whisker sheet involves first providing the whiskers in a predetermined size and concentration as a dispersion in a fluid medium, then applying the dispersion at a selected rate to a static or moving screen, and finally drying the sheet thus obtained. The concentration of the whiskers in the dispersion is made low enough so that the whiskers will remain suspended in the medium without clamping together and high enough for the sheet to retain its shape. Preferably the concentration is maintained at between about 0.5 to 2.5 grams of whiskers per liter of fluid used, which is usually water.

The degree of preferential orientation of whiskers in a given direction in the plane of the sheet varies with the relative rates of application of the dispersion liquid with respect to movement of the screen. When the screen is static, the whiskers are observed to be substantially randomly oriented in the plane of the sheet. On the other hand, when the screen is moving, and the relative rates are different, that is, when either the dispersion mixture is applied or the screen is moved at a faster rate than each other, the whiskers are found to orient themselves preferentially in one direction in the plane of the sheet.

The whisker dispersion is prepared by agitating the whiskers in water. The period of agitation depends upon the intensity of shear supplied by the mixer dispersion apparatus, and the size and concentration of whiskers desired. Too little agitation leaves clumps of undispersed whiskers which do not mat properly in the sheet forming process, while vigorous agitation results in excessive shortening of the whiskers so that the sheet does not have optimum strength. Usually the whiskers are agitated for about a half to four minutes in a blender.

The whisker dispersion mixture then is transferred to a sheet mold apparatus containing an equal volume of water. One form of such an apparatus is a Williams sheet mold provided with a static screen mesh having a large number of openings per inch, suitably between about 70 and 150 openings per inch. The diluted dispersion is stirred gently in the mold to maintain a uniform suspension. When turbulence subsides, the dispersion is passed through the screen. Thereupon there is formed a wet, porous mat of whiskers. A thick blotting pad larger than the sheet mold frame then is placed over the formed sheet to remove excess water. The sheet then is removed from the screen while it is attached to the blotter, and dried in an oven.

The procedure for forming a whisker sheet described above using a static screen results in the formation of a batch of whisker paper wherein the fibers lie substantially parallel to and randomly distributed in all directions in the plane of the sheet. To produce a continuous sheet of whisker paper in which the fibers are preferentially oriented in one direction in the plane of the sheet, a moving screen is employed, and the dispersion is applied at a slightly slower rate than the rate of movement of the screen.

FIGURES 2a through c illustrate the process steps by which the novel whisker articles of the present invention may be prepared. The first step involves the addition of a binder material to the whisker sheet of FIGURE 1a to form a whisker-binder sheet article. According to one embodiment, the binder is mixed with the loose whiskers during the preparation of the whisker sheet. Alternatively, the binder material can be impregnated directly into the whisker sheet itself. For example, the sheet article may be impregnated with a liquid plastic or metal, suitably in a solvent, and laminated or molded to form the whisker-sheet binder article.

A portion of the structure of the resultant whisker-sheet-binder article is shown in FIGURE 1b. The whiskers 2a, 2b, 2c, and 2d are wetted to binder material 5a, 5b, 5c, and 5d including their junction points 6. Essentially the binder performs two functions. First, it strengthens the whisker sheet itself by filling up the joint areas which loosely connect individual whiskers in the sheet. The binder material wets the whiskers in these areas so that the network of discontinuous whiskers are enmeshed firmly. Secondly, the binder wets the whiskers throughout their length, thereby serving as an intermediate bonding agent for connecting the whiskers to the matrix material.

The second step in the process is to provide a matrix for the whisker-sheet binder article. There are many different ways to provide the matrix, depending upon the kind of matrix material used. In one technique the whisker-sheet binder article is placed in a mold which is maintained at a suitable temperature. The matrix material is then cast into the mold and over the article. After cooling, the resultant whisker sheet composite, shown in FIGURE 1c, separated from the mold. In this structure the matrix material is wetted to the binder more strongly than it would be to the whisker itself directly. The presence of an enmeshed sheet network of whiskers provides a handable article.

The following specific examples will more particularly illustrate the invention.

EXAMPLE 1.—PREPARATION OF ALPHA-ALUMINA WHISKER SHEET COMPOSITE

A. Preparation of alpha-alumina whiskers

A boat for an aluminum charge is prepared by mixing 3 lbs. 2 oz. of ceramic powder material sold by Norton and Co. by designation "1162" having the following composition; 75 parts by weight alumina, 15 parts by weight silica, 5 parts by weight titania, 2.5 parts by weight ferric oxide and 2.5 parts by weight of other metallic oxides, and 0.16 lb. of 200 mesh aluminum powder (5% by weight of aluminum) in a slip-casting mold. The green ceramic then is fired in air at 2200° F. for about a half-hour. The boat thus prepared, having the dimensions 5 x 17 x 2 inches, and weighing about 3 lbs. 4 oz., is charged with 2 lbs. 8 oz. of aluminum pellets which are spread evenly on the bottom of the boat. The boat and aluminum charge then are inserted into a furnace having a cross-sectional open area of about 20 square inches. The temperature of the furnace is set at 2775° F. Purified hydrogen containing less than 20 p.p.m. of water vapor then is admitted into the furnace over the charge at a flow rate of 0.01 cu. ft./sec. for a period of about ten minutes. Thereupon a vaporous substance is produced from the charge. At this point 300 p.p.m. of water is added to the hydrogen gas stream and the flow rate is decreased to 0.001 cu. ft./sec. Ribbon formation then proceeds on the edges of the boat. After about twenty to thirty minutes, the water content of the hydrogen is increased to 3000 p.p.m. and flow rate is decreased to 0.0001 cu. ft./sec. The total growth period is about an hour. The boat then is removed from the furnace, cooled to room temperature, and the whisker product is isolated. The whiskers are alpha-alumina single crystals having a rhombohedral cross-section. A yield of about 2 g. of whisker material is collected. The width of the ribbons average between 10–100 microns; the length about 0.2 inches; and the thickness about 1–25 microns.

B. Preparation of alpha-alumina whisker sheet 4.5 g. of alpha-alumina single crystal whiskers of parallelogram in cross-section which are about 1/8 inch in length and 1 micron in diameter are mixed in 10 liters of water, and the resulting slurry is agitated for 2 minutes in a blender (Model 442–01—Osterizer) at 80° F. The agitated suspension then is passed through a molding assembly fitted with a fine mesh screen 8 inches square having 100 openings per inch. The whiskers are collected on the screen. They form a wet, porous sheet having a thickness of about 0.02 inch, which is removed from the screen and dried. The sheet thus formed consists of whiskers which are substantially uniformly distributed throughout the sheet. The flat surfaces of the whiskers lie substantailly parallel to the major surfaces of the sheet. The whiskers are randomly oriented in the plane of the sheet. The sheet is firm, springy, and can be handled easily. The bulk density of the paper is 3.55 g. per cubic inch, and its porosity is 98%. The tensile strength of the whiskers used in the paper is about $2.0–3.5 \times 10^6$ p.s.i. The modulus is $100–300 \times 10^6$ and its melting point is 3780° F.

C. Preparation of alpha-alumina-whisker-binder sheet article

Six whisker-sheets of alpha-alumina are prepared according to the procedure described above. Each sheet is 0.1 inch thick and about 2½ inches in diameter. The total amount of alpha-alumina whiskers in each sheet is about 1.5 g. The sheets then are stacked and submerged in a resin solution comprising 5% epoxy plastic solids in an organic solvent. The solvent is evaporated, and then the sheets are compressed lightly to a single sheet having a thickness of 0.060 inch, and the resin coated sheet is then cured. The resultant porosity of the sheet is 70%, and the product is observed to be quite springy, and has good handling properties.

D. Impregnation in matrix

The alpha-alumina whisker sheet as produced in 1(C) is placed on a high temperature resistant mold. The temperature is maintained at about 125° F. Then a liquid phenolic resin is applied, pressed and cured at 300 to 400 F. The resulting sheet is much stronger then the plastic itself.

EXAMPLE 2

A. Preparation of alpha-alumina whisker sheet 10 grams of alpha-alumina whiskers about 1/8 inch long and 3 microns in diameter are prepared in a dispersion in a liter of water. 0.1 g. of sodium polyphosphate is added to the mixture to aid in wetting the whiskers. The dispersion then is diluted to about 0.5 to 2.0 grams per liter with continuous stirring. The dilute dispersion is applied to a moving sheet-forming screen at a velocity which is somewhat slower than that of the movement of the screen. At the end of the screen a take-up roll is provided to remove the paper product. Thus a continuous sheet of whisker paper is formed on the screen of the machine. The whiskers are observed to be oriented preferentially in the direction of the screen.

B. Preparation of alpha-alumina-whisker-binder sheet article

The preferentially oriented whisker sheet made in 2(A) above is coated with nickel metal binder by gas plating from nickel carbonyl.

C. Impregnation in matrix

The nickel coated whisker sheet article is then made into a high strength whisker sheet composite by impregnating with a cast alloy aluminum matrix. The strength of the aluminum matrix is doubled with a 10% addition of whiskers. Without the binder, the cast metal does not impregnate the sheet.

EXAMPLE 3

Following the procedure described in Examples 1 and 2, and using equivalent quantities of silicon carbide, aluminum nitride, magnesium oxide, beryllium oxide, boron carbide and silicon nitride whiskers of comparable size in place of alpa-alumina whiskers, there is produced similar whisker articles of these whisker materials.

EXAMPLE 4

The whisker sheet article as prepared in Example 1(A) is dipped into a silica solution, dried and fired at 1000° C. Then the resultant article is provided with a ceramic matrix by slip-casting in a Mullite ceramic mix. Finally the product is fired at elevated temperatures. A high strength, whisker reinforced ceramic article with improved thermal and mechanical shock properties as compared to the ceramic matrix itself, is obtained.

EXAMPLE 5

Four alpha-alumina whisker sheets each having a porosity of 95 to 99% (0.5 gm. whiskers per sq. in.), each being 10 mils, are impregnated with liquid epoxy. The resulting sheet is laminated to 8 mils, and a phenolic resin matrix is added. A high strength whisker sheet composite article is produced.

While the invention has been described with particular reference to certain embodiments thereof, it is understood that it is not limited thereto, but shall embrace that which is within the skill of the art and the scope of the invention.

What is claimed is:
1. A high-strength whisker paper composite article comprising:
  (a) a whisker paper having a plurality of substantially discontinuous and interconnected single crystal whiskers oriented substantially parallel to the major surfaces of the paper, preferentially in one direction in the plane of the paper, said whiskers having a length of about 200–2500 microns, a diameter of about 0.5–50 microns, and a length-to-diameter ratio of about 50–5,000, and being selected from among metallic oxides, carbides and nitrides, said paper being compact, firm and compressible,
  (b) a binder impregnated into said paper and wetted to said whiskers including their juncture points, said binder being selected among plastics, metals and ceramics, and
  (c) a matrix bonded to said composite, said binder serving as an intermediate between said whiskers and said matrix.
2. A high-strength whisker laminate composite comprising:
  (a) a plurality of whisker paper-composite articles as defined in claim 1 laminated together, and
  (b) a matrix material selected from among plastics, metals and ceramics for said papers, bonded to said laminate and forming a shaped-article therewith.

References Cited

UNITED STATES PATENTS

| | | | |
|---|---|---|---|
| 2,491,761 | 12/1949 | Parker et al. | |
| 2,633,433 | 3/1953 | Hollenberg | 117—140 X |
| 2,702,069 | 2/1955 | Lannan | 117—140 X |
| 2,731,359 | 1/1956 | Nicholson | 162—152 X |
| 2,774,687 | 12/1956 | Nottebohm et al. | 117—140 X |
| 2,901,390 | 8/1959 | Conklin et al. | 117—123 X |
| 2,971,095 | 2/1961 | Drummond. | |
| 3,007,813 | 11/1961 | Levecque et al. | 117—126 X |
| 3,032,278 | 5/1962 | Thomas et al. | |
| 3,077,380 | 2/1963 | Wainer et al. | 23—142 |
| 3,077,413 | 2/1963 | Campbell | 117—123 X |
| 3,100,734 | 8/1963 | Rex, et al. | 162—152 |
| 3,147,085 | 9/1964 | Gatti | 23—142 X |
| 3,175,884 | 3/1965 | Kuhn | 23—208 X |

WILLIAM D. MARTIN, Primary Examiner

H. J. GWINNELL, Assistant Examiner

U.S. Cl. X.R.

117—107.2, 123, 140, 160, 161; 162—145, 152, 157